(12) United States Patent
Moratz

(10) Patent No.: US 9,765,820 B2
(45) Date of Patent: Sep. 19, 2017

(54) HIGH SPEED TWO-PIECE DEEP GROOVE BALL BEARING CAGE WITH INTEGRAL LUBRICANT RESERVOIR

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 126 days.

(21) Appl. No.: 14/944,813

(22) Filed: Nov. 18, 2015

(65) Prior Publication Data

US 2017/0138399 A1 May 18, 2017

(51) Int. Cl.
*F16C 33/38* (2006.01)
*F16C 33/66* (2006.01)
*F16C 33/42* (2006.01)
*F16C 19/10* (2006.01)

(52) U.S. Cl.
CPC ............ *F16C 33/427* (2013.01); *F16C 19/10* (2013.01); *F16C 33/6681* (2013.01)

(58) Field of Classification Search
CPC .............. F16C 33/3831; F16C 33/3862; F16C 33/3868; F16C 33/3875; F16C 33/6651
See application file for complete search history.

(56) References Cited

U.S. PATENT DOCUMENTS 4,073,552 A * 2/1978 Christy ............... F16C 33/3831
384/470
4,324,444 A 4/1982 Buczynski et al.
4,787,757 A 11/1988 Finger

FOREIGN PATENT DOCUMENTS

JP 2001271842 A * 10/2001 ............. F16C 33/32
JP 2007263279 A * 10/2007 .......... F16C 33/3875

OTHER PUBLICATIONS

Barden Precision Cages—For Spindle, Turbine, Miniature and Instrument Ball Bearings—Oct. 1996.

* cited by examiner

*Primary Examiner* — Phillip A Johnson
(74) *Attorney, Agent, or Firm* — Volpe and Koenig, P.C.

(57) ABSTRACT

A cage assembly for a rolling bearing including an improved lubricant configuration is provided. The cage includes a first cage half including a first rim and a first plurality of webs, and a second cage half including a second rim and a second plurality of webs. The first and second cage halves are assembled together with end faces of the first and second plurality of webs contacting each other to define a plurality of rolling element pockets. A first side plate is fastened to the first rim of the first cage half. A second side plate is fastened to the second rim of the second cage half. Lubricant is located in a first reservoir defined by a first groove in either the first rim or first side plate and is also located in a second reservoir defined by a second groove in either the second rim or the second side plate.

14 Claims, 4 Drawing Sheets

HIGH SPEED TWO-PIECE DEEP GROOVE BALL BEARING CAGE WITH INTEGRAL LUBRICANT RESERVOIR

FIELD OF INVENTION

The present invention relates to a bearing assembly and is more particularly related to an improved lubrication arrangement for a bearing assembly.

BACKGROUND

Bearing assemblies are used in a wide variety of applications, including automotive applications. One type of bearing assembly, for example a Conrad bearing, includes a cage for guiding rolling elements as the rolling elements run between a radially inner bearing ring and a radially outer bearing ring. One known type of cage is called a "T" cage, which includes two riveted cage halves, each having a rim and webs that contact one another to define rolling element pockets. These known cages include reinforcing plates on outer sides of the assembly.

The running surfaces of the rolling elements and the radially inner and outer bearing rings can experience friction, which negatively affects the performance of a bearing assembly. Providing lubrication to these running surfaces helps reduce friction and improves the performance of the bearing assembly. There is a need to continuously provide more lubricant to a bearing assembly in use. To that end, it would be desirable to provide more efficient configurations for storing and distributing the lubricant to the running surfaces of a bearing assembly to ensure continuous lubrication for longer bearing life.

SUMMARY

A larger, more efficient lubricant reservoir configuration is provided for a "T" cage assembly for a rolling bearing arrangement. The cage assembly includes a first cage half including a first rim and a first plurality of webs, and a second cage half including a second rim and a second plurality of webs. The first and second cage halves are assembled together with end faces of the first and second plurality of webs contacting each other to define a plurality of rolling element pockets. A first side plate is fastened to the first rim of the first cage half and at least one of the first rim or the first side plate includes a first groove facing the other one of the first rim or the first side plate. A first passage extends from the first groove to an outer surface of the first cage half or the first side plate including the first groove. Lubricant is located in a first reservoir defined by the first groove and the other one of the first rim or the first side plate. Preferably, a second side plate is fastened to the second rim of the second cage half, and at least one of the second rim or the second side plate includes a second groove facing the other one of the second rim or the second side plate. A second passage extends from the second groove to an outer surface of the second cage half or the second side plate including the second groove. Preferably, lubricant is located in a second reservoir defined by the second groove and other one of the second rim or the second side plate. The first and second grooves can be provided in the first and/or second rims or in the first and/or second side plates, or both.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
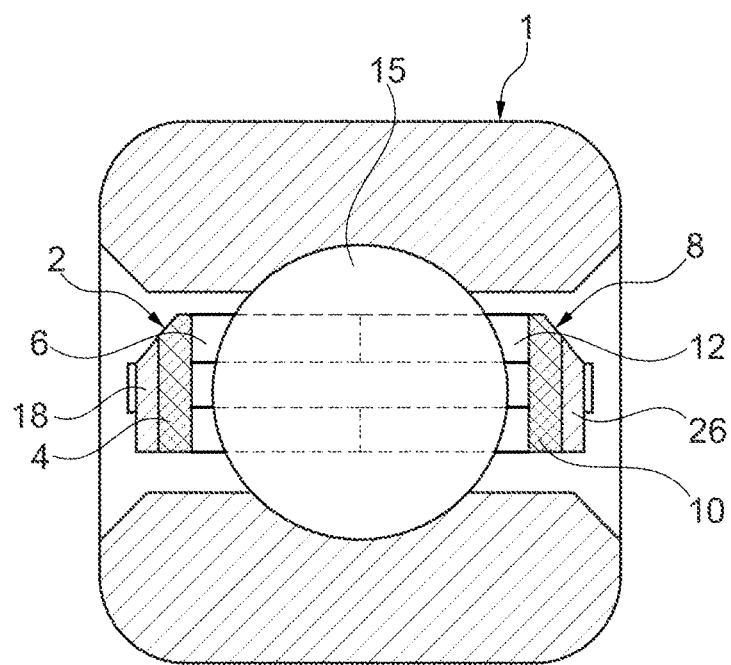
FIG. 1 shows a cross section view of a bearing assembly with a T-cage according to the prior art.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
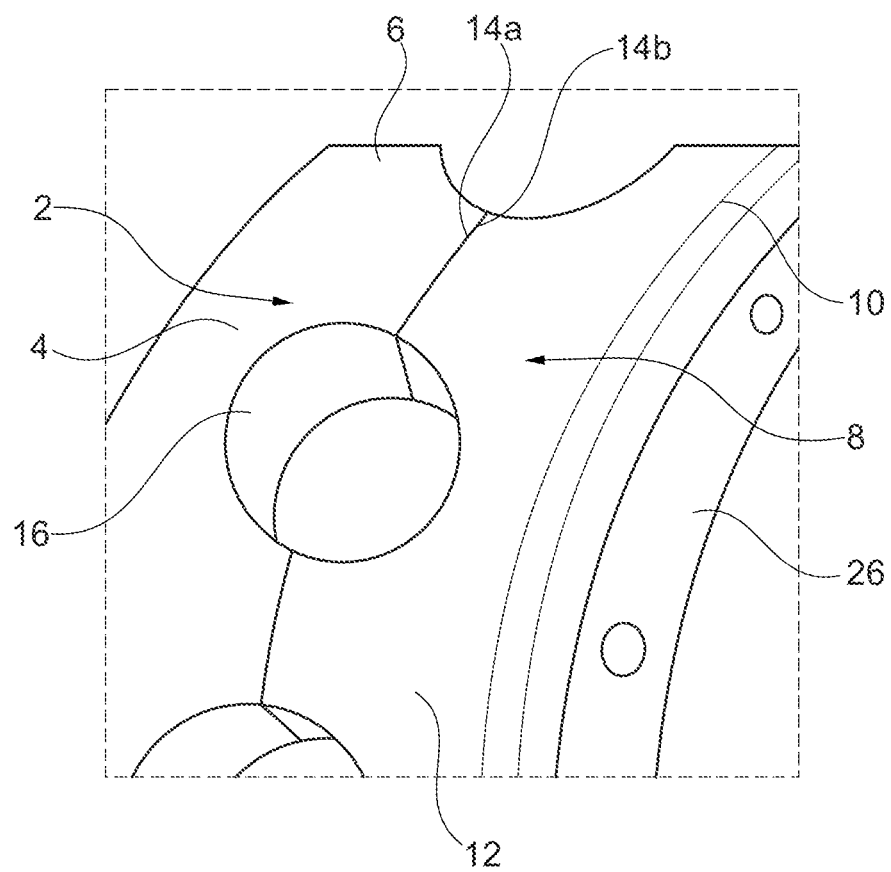
FIG. 2 shows a perspective view of the T-cage of FIG. 1.

FIGS. 1 and 2 illustrate a known cage assembly 1 including a first cage half 2 comprising a first rim 4 and a first plurality of webs 6, and a second cage half 8 comprising a second rim 10 and a second plurality of webs 12. The first cage half 2 and the second cage half 8 are assembled together with end faces 14a, 14b of the first and second plurality of webs 6, 12 contacting each other to define a plurality of rolling element pockets 16 for rolling elements 15, such as spherical bearing balls. A first side plate 18 is fastened to the first rim 4 of the first cage half 2, and a second side plate 26 is fastened to the second rim 10 of the second cage half 8.

Figure 3:
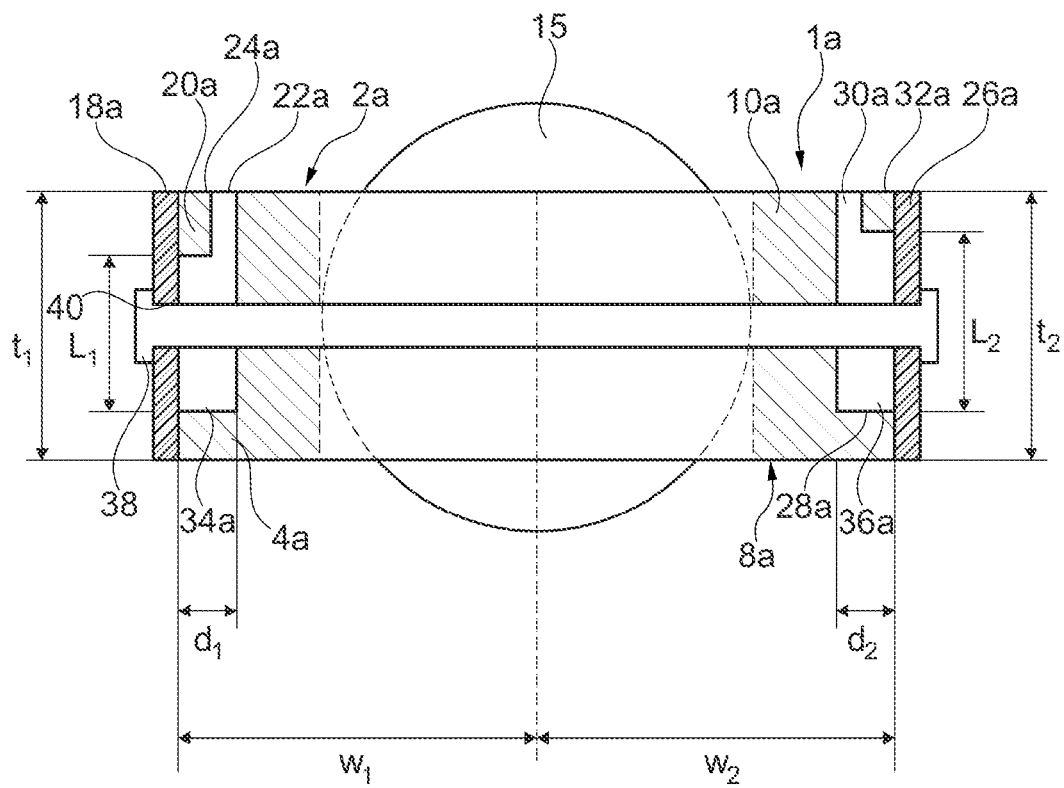
FIG. 3 shows a first embodiment of a cage according to the invention in a cross section view.
Figure 4:
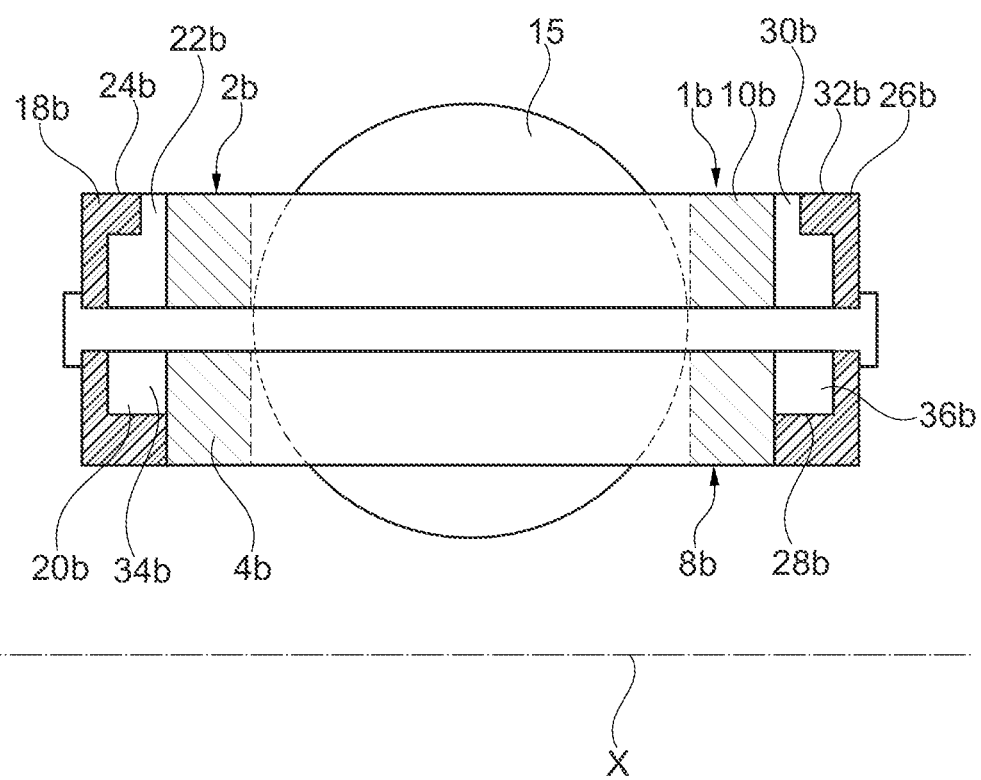
FIG. 4 shows a second embodiment of a cage according to the invention in a cross section view.

The first and second embodiments of the cage 1a, 1b, as shown in FIGS. 3 and 4 respectively, disclose at least one of the first rim 4a, 4b or the first side plate 18a, 18b includes a first groove 20a, 20b facing the other one of the first rim 4a, 4b or the first side plate 18a, 18b. Preferably, at least one of the second rim 10a, 10b or the second side plate 26a, 26b includes a second groove 28a, 28b facing the other one of the second rim 10a, 10b or the second side plate 26a, 26b. In the first embodiment shown in FIG. 3, the first rim 4a includes the first groove 20a. As shown in FIG. 3, the first side plate 18a is a thin-plate washer. In the first embodiment, the first groove 20a preferably extends circumferentially in the first rim 4a. A first passage 22a extends from the first groove 20a to an outer surface 24a of the first cage half 2a. Lubricant is provided to a first reservoir 34a defined by the first groove 20a of the first rim 4a and the first side plate 18a. In the first embodiment, the second rim 10a also includes the second groove 28a, and a second passage 30a extends from the second groove 28a to an outer surface 32a of the second cage half 8a. The second groove 28a preferably extends circumferentially in the second rim 10a. Lubricant is provided to a second reservoir 36a defined by the second groove 28a defined in the second rim 10a and the second side plate 26a.

In the second embodiment shown in FIG. 4, the first side plate 18b includes the first groove 20b. In this embodiment, the first side plate 18b is thicker than the first side plate 18a of the first embodiment shown in FIG. 3. The first groove 20b preferably extends circumferentially in the first side plate 18b. In this embodiment, a first passage 22b extends from the first groove 20b to an outer surface 24b of the first side plate 18b. Lubricant is provided to a first reservoir 34b defined by the first groove 20b of the first side plate 18b and the first rim 4b. The first passage 22a, 22b in both the first and second embodiments preferably extends in a radially outward direction. As shown in FIG. 4, preferably the second side plate 26b includes the second groove 28b, and a second passage 30b extends from the second groove 28b to an outer surface 32b of the second side plate 26b in the second embodiment. The second groove 28b preferably extends circumferentially in the second side plate 26b. In this embodiment, lubricant is provided to a second reservoir 36b defined by the second groove 28b defined in the second side plate 26b and the second rim 10b. The second passage 30a, 30b also preferably extends in a radially outward direction. One of ordinary skill in the art will recognize from the present disclosure that other configurations and orientations for the first passage 22a, 22b and the second passage 30a, 30b can be used. Orienting the passages in a radially outward direction provides an improved configuration that urges base oil lubricant to be flung out during rotation of the bearing due to centrifugal forces, while thickener lubricant is retained in the recesses.

In both the first and second embodiments, the first side plate 18a, 18b is fastened to the first rim 4a, 4b of the first cage half 2a, 2b, and the second side plate 26a, 26b is fastened to the second rim 10a, 10b of the second cage half 8a, 8b by a plurality of fastening elements 38. The plurality of fastening elements 38 preferably extend though fastening holes 40 that pass through the first side plate 18a, 18b, the first rim 4a, 4b and the first plurality of webs 6a, 6b of the first cage half 2a, 2b, the second plurality of webs 12a, 12b and the second rim 10a, 10b of the second cage half 8a, 8b, and the second side plate 26a, 26b. In one embodiment, the plurality of fastening elements 38 comprises rivets. The rivets are preferably formed from aluminum to minimize the resulting forces on the assembly during riveting. One of ordinary skill in the art recognizes that other fastening configurations can be used to fasten the first cage half 2a, 2b with the second cage half 8a, 8b, such as inter-locking end faces on the webs.

As shown in FIG. 3, the first groove 20a, 20b and the second groove 28a, 28b each have a height ($L_1$, $L_2$) that is 40-60% of a thickness ($t_1$, $t_2$) of each of the first cage half 2a, 2b and second cage half 8a, 8b. As shown in FIG. 3, the first groove 20a, 20b and second groove 28a, 28b each have a depth ($d_1$, $d_2$) that is 10-20% of a width ($w_1$, $w_2$) of each of the first cage half 2a, 2b and second cage half 8a, 8b. These dimensions are illustrated in FIG. 3; however, one of ordinary skill in the art will recognize from the present disclosure that the same values can be used for the second embodiment in FIG. 4. One of ordinary skill in the art also recognize that these values can be increased or decreased, depending on the amount of lubricant required for a specific bearing assembly.

In one embodiment, the first side plate 18, 18' and the second side plate 26, 26' are each comprised of metal. In one embodiment, the first cage half 2, 2' and the second cage half 8, 8' are each comprised of non-metal, preferably a polymeric or composite material. In one embodiment, the first cage half 2, 2' and the second cage half 8, 8' are each comprised of phenolic resin.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A cage assembly for a rolling bearing comprising:
a first cage half including a first rim and a first plurality of webs;
a second cage half including a second rim and a second plurality of webs;
the first and second cage halves are assembled together with end faces of the first and second plurality of webs contacting each other to define a plurality of rolling element pockets;
a first side plate fastened to the first rim of the first cage half, at least one of the first rim or the first side plate includes a first groove facing the other one of the first rim or the first side plate, and a first passage extends from the first groove to an outer surface of the first cage half or the first side plate including the first groove; and
lubricant located in a first reservoir defined by the first groove and the other one of the first rim or the first side plate.

2. The cage assembly of claim 1, further comprising:
a second side plate fastened to the second rim of the second cage half, at least one of the second rim or the second side plate includes a second groove facing the other one of the second rim or the second side plate, and a second passage extends from the second groove to an outer surface of the second cage half or the second side plate including the second groove; and lubricant is located in a second reservoir defined by the second groove and other one of the second rim or the second side plate.

3. The cage assembly of claim 2, wherein the first groove is defined in the first rim, and the second groove is defined in the second rim.

4. The cage assembly of claim 2, wherein the first groove is defined in the first side plate, and second groove is defined in the second side plate.

5. The cage assembly of claim 2, wherein the first groove extends circumferentially around the first rim, and second groove extends circumferentially around the second rim.

6. The cage assembly of claim 2, wherein the first groove extends circumferentially around the first side plate, and second groove extends circumferentially around the second side plate.

7. The cage assembly of claim 2, wherein the first and second passages extend in a radially outward direction.

8. The cage assembly of claim 2, wherein the first side plate is fastened to the first rim of the first cage half and the second side plate is fastened to the second rim of the second cage half by a plurality of fastening elements extending though fastening holes that pass through the first side plate, the first rim and the first plurality of webs of the first cage half, the second plurality of webs and the second rim of the second cage half, and the second side plate.

9. The cage assembly of claim 8, wherein the plurality of fastening elements are rivets.

10. The cage assembly of claim 2, wherein the first and second grooves each have a height that is 40-60% of a thickness of each of the first and second cage halves.

11. The cage assembly of claim 2, wherein the first and second grooves each have a depth that is 10-20% of a width of each of the first and second cage halves.

12. The cage assembly of claim 2, wherein the first and second side plates are comprised of metal.

13. The cage assembly of claim 2, wherein the first and second cage halves are comprised of non-metal.

14. The cage assembly of claim 2, wherein the first and second cage halves are comprised of phenolic resin.

* * * * *